(12) United States Patent
Deaconu et al.

(10) Patent No.: US 10,735,951 B2
(45) Date of Patent: Aug. 4, 2020

(54) IDENTIFIER OF VARIABLE LENGTH FOR A POOL OF CORE NETWORK CONTROL ENTITIES

(71) Applicant: Telefonaktiebolaget LM Ericsson (publ), Stockholm (SE)

(72) Inventors: Florin Alexandru Deaconu, Eschweiler (DE); Kostas Kouridakis, Athens (GR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/338,812

(22) PCT Filed: Oct. 21, 2016

(86) PCT No.: PCT/EP2016/075414
§ 371 (c)(1),
(2) Date: Apr. 2, 2019

(87) PCT Pub. No.: WO2018/072848
PCT Pub. Date: Apr. 26, 2018

(65) Prior Publication Data
US 2020/0045532 A1 Feb. 6, 2020

(51) Int. Cl.
*H04W 8/26* (2009.01)
*H04W 76/11* (2018.01)
(Continued)

(52) U.S. Cl.
CPC ........... *H04W 8/26* (2013.01); *H04W 76/11* (2018.02); *H04W 88/08* (2013.01); *H04W 84/045* (2013.01)

(58) Field of Classification Search
None
See application file for complete search history.

(56) References Cited

U.S. PATENT DOCUMENTS

| 2003/0013485 A1* | 1/2003 | Jung ..................... H04W 8/245 455/557 |
| 2009/0186612 A1* | 7/2009 | Aghili ................... H04W 60/00 455/432.1 |
| 2013/0114567 A1* | 5/2013 | Bojeryd ............ H04W 36/0022 370/332 |

OTHER PUBLICATIONS

International Search Report and Written Opinion of the International Searching Authority for International Application No. PCT/EP2016/075414 dated Jun. 27, 2017.
(Continued)

*Primary Examiner* — Anh Ngoc M Nguyen
(74) *Attorney, Agent, or Firm* — Patent Portfolio Builders, PLLC

(57) ABSTRACT

A method for operating a network entity is provided in a wireless communications network. The method includes receiving a message comprising a temporary identifier of a mobile entity. The temporary identifier is used to temporarily identify the mobile entity. The temporary identifier includes an identifier of variable length which is used to identify a core network control entity which controls the mobile entity when connected to the network. The method determines a length indicator present in the temporary identifier, where the length indicator indicates a length of the identifier in the temporary identifier. The method determines the identifier in the temporary identifier based on the length indicator and the core network control entity based on the identifier, and transmits the received message to the determined core network control entity.

20 Claims, 8 Drawing Sheets

(51) Int. Cl.
*H04W 88/08* (2009.01)
*H04W 84/04* (2009.01)

(56) References Cited

OTHER PUBLICATIONS

3GPP TS 23.003 V14.0.0, "3rd Generation Partnership Project; Technical Specification Group Core Network and Terminals; Numbering, addressing and identification (Release 14)," 102 pages, Jun. 2016.
3GPP TS 23.236 V13.0.0, "3rd Generation Partnership Project; Technical Specification Group Services and System Aspects; Intradomain connection of Radio Access Network (RAN) nodes to multiple Core Network (CN) nodes (Release 13)," 41 pages, Jun. 2015.
Nokia, "NRI Coordination in Shared Network, " 3GPP TSG-SA2 Meeting #40, Sophia Antipolis, France, S2-041974, 5 pages, May 17-21, 2004.
3GPP TS 23.236 V14.0.0, "3rd Generation Partnership Project; Technical Specification Group Services and System Aspects; Intradomain connection of Radio Access Network (RAN) nodes to multiple Core Network (CN) nodes (Release 14)," 41 pages, Sep. 2016.
Siemens, "Network Node Identification," TSG-SA WG2, Iu Flex drafting meeting, Duesseldorf, Germany, S2-IuFlex-015, 1 page, Apr. 19-20, 2001.

* cited by examiner

IDENTIFIER OF VARIABLE LENGTH FOR A POOL OF CORE NETWORK CONTROL ENTITIES

CROSS REFERENCE TO RELATED APPLICATION

This application is a 35 U.S.C. § 371 national stage application of PCT International Application No. PCT/EP2016/075414, filed on Oct. 21, 2016, the disclosure and content of which is incorporated by reference herein in its entirety.

TECHNICAL FIELD

The present application relates to a method for operating a network entity provided in a wireless communications network and the corresponding network entity. Furthermore, a method for operating a core network control entity is provided and the corresponding core network control entity. Additionally a system comprising the network entity and the core network control entity is provided and a computer program comprising programme code and a carrier comprising the computer program are provided.

BACKGROUND

In the current implementation of a pool of core network control entities, all members of a pool are identified by an indicator that has the same bit-length for all members of the same pool of a certain type. Additionally, in most presently used pool implementations (with a very few amount of pools of a certain type deployed on country level), the node identifier must be also unique on country-level.

The indicator used in the MME (Mobility Management entity) pool implementation has a fix length of 8 bits and it represents the MME Code and it is separated from the TMSI (Temporary Mobile Subscriber Identity) field which is 32-bits long, they are forming together the SAE (System Architecture Evolution)-TMSI (S-TMSI) which is part of GUTI (Globally Unique Temporary ID), while for the SGSN (Serving GPRS Support Node) and MSC (Mobile Switching Center) pool, a special node identification field (the Node Resource Identifier, NRI) is part of the TMSI field and, according with the current standards, has a fixed length for all Core networks control entities that are part of the same pool and cannot be changed during normal pool operation without major traffic disturbances of the registered mobile users. The NRI shall have a unique value within a pool (or even within a network in case there are not enough pools deployed or the operator does not want to risk reusing the NRIs in non-adjacent pools). The TMSI length in the SGSN and MSC-Server is 32-bits long (as specified in 3GPP TS 23.003).

Telecommunication networks are evolving and growing; geographical redundancy, equally distributed traffic on all core network control entities, fast network expansion procedure, shorter time to market for new features and network capacity expansions are some of the main aspects in a modern mobile communication network, independently if we talk about a 4G LTE (Long Term Evolution) network (MME as a core network control entity), a 2G or 3G PS (packet switched) network (SGSN as a core network control entity) or a 2G or 3G CS network (MSC-S as a core network control entity), or any future communication network. A common answer to all these aspects is offered by the pooling mechanisms used in the core networks and by deploying pools of all types of core network control entities (for example MME, SGSN and MSC-S).

The current 3GPP standards are limiting the expansion and flexibility capabilities of core network pools, the node identifier used to help the radio network control entities to route the UE (user equipment) traffic to the proper core network control entity is either limited to a single and fixed length (8-bits can be used to identify an MME member of a pool) or, even when different bit-lengths are possible, only one length can be used for all pool deployments of a certain type (for SGSN and MSC pools). Changing of the length of the identifier is usually a complex and risky process that might imply complete removal of the pool definitions in the complete network, activity that cannot be performed without traffic impacts.

Since the S-TMSI structure for LTE comprises an 8-bit fixed length used for the MME Code (equivalent to the NRI used in SGSN and MSC-S pools), the limitation is not as critical as 2G or 3G, since it still allows a 32-bit TMSI field—the combinations of the two allows in LTE a higher capacity and potential number of MME nodes in a network with lower risk of hitting any limitation on both of the two fields compared to 2G or 3G).

On the other hand, using a similar logic as for LTE on the SGSN or MSC-S P (Preliminary)-TMSI or TMSI a fixed length NRI of 8 bits would limit significantly the capacity of a node or limit the amount of nodes that can be deployed in a network: In general when the number of bits provided for the length of the NRI increases, the number of available bits for the TMSI is decreased. This also means that less subscribers can be stored in the Visited Location register (VLR) for one NRI value if the length of the NRI is big, and less VLRs can be located in the pool for one NRI value if the length of the NRI is short.

Even if 3GPP TS 23.236 presents the possibility to reuse NRIs in non-adjacent pools, the known implementations have shown that this is an unwanted practice due to the risk that for subscribers which travel between two pools that are sharing the same NRI numbers, the radio network part cannot recognize that this is a new subscriber in the pool (new subscriber meaning that it comes from another core network control entity in another pool) and that the subscriber should be distributed to a core network control entity of the new pool according with the core network control entities capacity factors defined for the registration procedure in the radio network and, subsequently, get a new NRI related to the selected core network control entity. This behavior creates unbalancing between the core network control entity members of the new pool, since the capacity provided by each member of the pool is not taken into account.

In order to avoid multiple UEs having the same NRI and TMSI within the same pool it is also recommended that operators are keeping a low amount of pools deployed in one network and that the NRIs shall be uniquely allocated on network level for all pools of the same type. Furthermore, due to the fact that the NRI has a fixed length, the maximum number of nodes of a certain type that can be pooled in one network is limited to the selected bit-length of the NRI.

The need to expand the pool with additional nodes or increase nodes' capacity (when all NRIs have been used) might lead to major problems: in order to be able to further expand the pool, the NRI length needs to be expanded, new and current NRIs needs to be allocated, TMSI reallocation for all subscribers and subscriber redistribution in the pool have to be ordered. In the current implementation, such action cannot be done without major traffic disturbance: the pool has to be redefined, nodes get new NRIs with a different length, distribution tables in the radio controllers change and, the worse, traffic disturbances (e.g. MO (Mobile Originating) transaction failures), increased signaling load to the HLRs (Home Location Registers), massive subscriber redistributions, increased paging failure and of the amount of global paging attempts), and all UEs will need to receive new TMSIs.

With the introduction of blade-specific architectures and virtualization of the core network control entities, the above-listed issues will become even more obvious and additional limitations might appear—e.g. due to the need to adapt the cloud network architecture on the fly, based on current traffic needs, additional capacity of NFVs (Network Function Virtualization) have to be added or removed from a pool at any moment of time without any traffic disturbances.

Furthermore when pools of core network control entities are used, these entities may have different capacities. As the NRI length is fixed for all the members of the pool, then the core network control entity with the high capacity has the same number of TMSIs available compared to a core network control entity with a lower capacity due to the fixed length. Thus the core network control entity with the high capacity can not allocate more TMSIs than the core network control entity with the low capacity, even though it would have the capacity to do so.

SUMMARY

Accordingly a need exists to overcome the above mentioned drawbacks and to provide a possibility of extending a pool of core network control entities in an effective and more flexible way without disturbing the current traffic handled by the pool.

This need is met by the features of the independent claims. Further aspects are described in the dependent claims.

According to a first aspect a method for operating a network entity is provided in a wireless communications network. The network entity receives a message comprising a temporary identifier of a mobile entity, wherein the temporary identifier is used to temporarily identify the mobile entity. The temporary identifier comprises an identifier of variable length, which is used to identify a core network control entity, which controls the mobile entity when connected to the network. Furthermore, a length indicator present in the temporary identifier is determined, wherein the length indicator indicates the length of the identifier in the temporary identifier. Additionally the identifier in the temporary identifier is determined based on the length identifier and the core network control entity is determined based on the identifier. Furthermore, the received message is transmitted to the determined core network control entity.

Additionally the corresponding network entity is provided which comprises a memory and at least one processor, wherein the memory contains instructions executable by the at least one processor, wherein the entity is operative to carry out the steps mentioned above and explained in more detail below. The network entity, which can be a radio network control entity, can deal with identifiers of variable length. The network entity receives the message with the temporary identifier and the length of the identifier contained in the temporary identifier is not fixed but may vary from case to case. The network entity uses the length indicator to determine the length of the identifier and based on the length indicator the identifier (of the core network control entity) in the temporary identifier can be determined. Accordingly, it is possible to use identifiers of variable length.

Furthermore, a method for operating a core network control entity is provided in a pool of core network control entities, wherein the pool is configured to control mobile entities. The core network control entity comprises a plurality of different identifiers of a variable length, wherein each identifier is used to identify the court network control entity. According to one step a new mobile entity is detected by the core network control entity which is not yet controlled by one of the core network control entities of the pool. Furthermore, an identifier from the plurality of identifiers is selected for the mobile entity which is used to identify the core network control entity. Furthermore a length of the selected identifier is determined and a length indicator is generated which indicates the length of the identifier. Furthermore the temporary identifier for the mobile entity is generated which is used to temporarily identify the mobile entity. The temporary identifier is generated such that the length indicator and the identifier are part of the temporary identifier. Furthermore, the generated temporary identifier is assigned to the new mobile entity.

Furthermore, the corresponding core network control entity in the pool of core network control entities is provided wherein the core network control entity comprises a memory and at least one processor and the memory contains instructions executable by the at least one processor, wherein the entity is operative to carry out the steps of the core network control entity mentioned above and discussed in more detail below.

The core network control entity stores or at least has access to identifiers with different lengths, so that a first identifier of the core network control entity has a defined length whereas another identifier of the core network control entity has a another length, which is different from the defined length. The core network control entity generates a length indicator, which is included into the temporary identifier. Any node receiving the temporary identifier uses, as mentioned above, the length indicator in order to determine the length of the identifier and based on the length it is possible to extract the identifier in the sequence of bits in the temporary identifier.

The core network control entity may furthermore comprise a module for detecting a new mobile entity. Furthermore, a module for selecting an identifier from the plurality of different identifiers of variable length can be provided. The core network control entity can additionally comprise a module for determining the length of the identifier and a module for generating a length indicator indicates the length of the identifier. Furthermore, a module for generating the temporary identifier is provided which is generated such that the length indicator and the identifier are part of the temporary identifier and a module is provided which assigns the generated temporary identifier to new detected mobile entity.

As far as the entity receiving the message comprising the temporary identifier is concerned, this entity can comprise a module for receiving the message with the temporary identifier. Furthermore, a module for determining the length indicator present in the temporary identifier can be provided. The entity can furthermore comprise a module for determining the identifier in the temporary identifier and a module for transmitting the received message to the determined core network control entity.

Furthermore, a system comprising the network entity of the wireless network and comprising the core network control entity as mentioned above are provided.

Additionally a computer program comprising programme code to be executed by at least one processor of the network entity or of the core network control entity is provided, wherein execution of the program code causes the at least one processor to execute a method mentioned above or explained in more detail below.

Additionally a carrier comprising the computer program is provided wherein the carrier is one of an electronic signal, optical signal, radio signal or computer readable storage medium. The carrier can comprise any recordable type media such as a hard disk, memory stick, random access memory (RAM), CD-ROM, DVD or the like.

It is to be understood that the features mentioned above and features yet to be explained below can be used not only in the respective combinations indicated, but also in other combinations or in isolation without departing from the scope of the present invention.

Features of the above-mentioned aspects and embodiments may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION OF EMBODIMENTS

Figure 1:
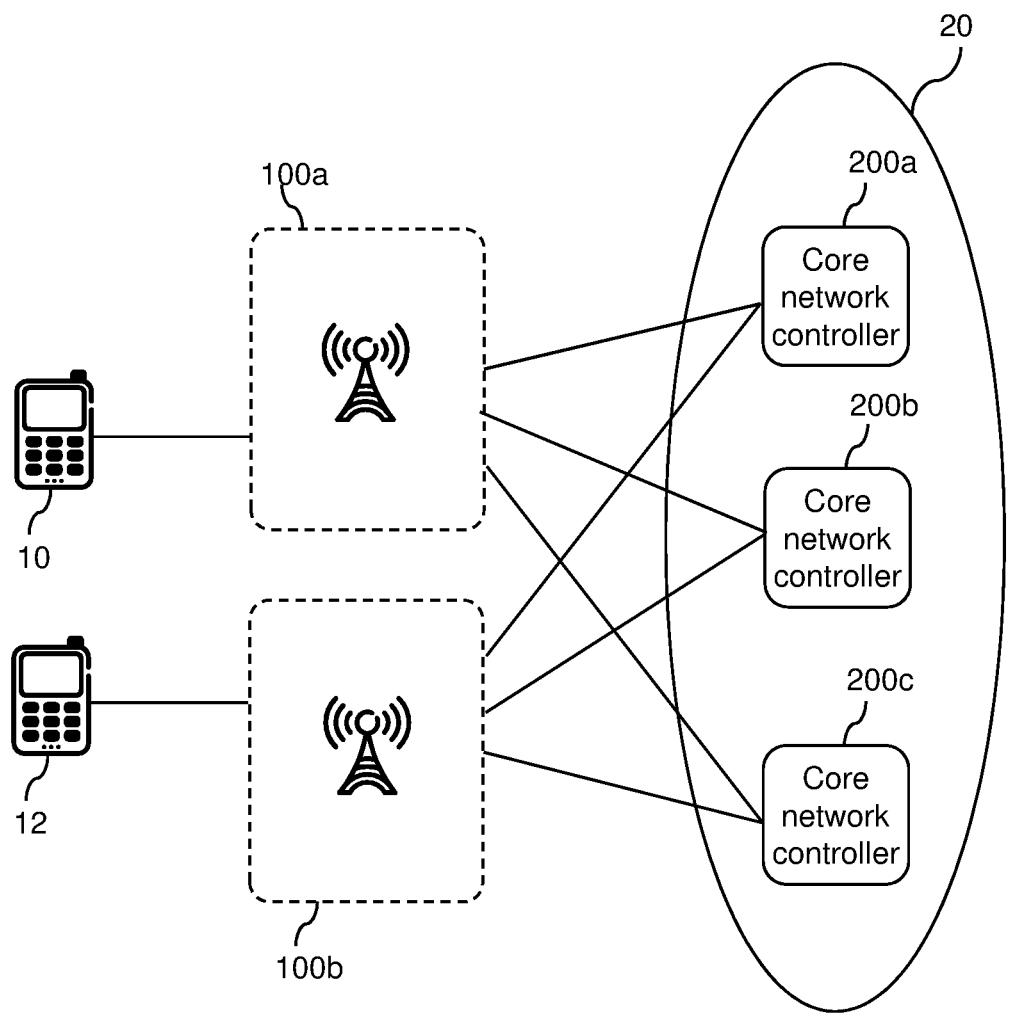
FIG. 1 shows an example architecture view of a system in which mobile entities are controlled in the network by a pool of core network controllers wherein the core network controllers can use identifiers identifying the core network control entity which have a variable length.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection.

Functional blocks may be implemented in hardware, software, firmware, or a combination thereof.

The idea described below presents a new mechanism that will allow the extension of a pool of core network control entities outside the limits imposed by a pre-allocated identifier length without the need to reconfigure the whole pool of core network control entities and its surrounding nodes and without traffic disturbances.

In order to allow the above-described mechanism, the way how the core network node is identified within the temporary identifier structure is changed, and the logic used by the core and radio network control entities to fetch the core network node identifier within the temporary identifier is adapted to the new temporary identifier structure and content. In the following, the expression of the "temporary identifier", or TMSI, is used hereinafter to describe the identity used between the core network control entity and the mobile entity for communication instead of the IMSI for protecting the identity of a subscriber using the mobile entity independent of the fact whether it is a 2G, 3G, LTE or other type of network.

The application proposes a new flexible addressing scheme for core network control entities of a pool. It is proposed to use the existing TMSI container and to use a new way to repartition its content For example in FIG. 2 32 bit in total for the temporary identifier are used, however also different lengths are possible utilizing a similar flexible addressing scheme as proposed. An "NRI length" field or length indicator (for example 3 bit long) is introduced that allows a flexible definition of the NRI length, and thus indirectly also the length of a mobile bit section where a mobile identifier part (TMSI field) is stored. This approach allows addressing one core network control entity with identifiers of different lengths, thus supporting expansion and flexibility capabilities in a pool of core network nodes. Alternatively a core network entity can be identified by two fields, the "NRI length" and the "NRI value". Thus a NRI value does not have to be unique any longer (for example NRI value=5 can be combined with any NRI lengths between 3 and 7 and therefore 5 nodes can be identified by the combination of NRI value=5 and any of the 5 possible NRI lengths (3 bit, 4 bit, 5 bit, Gbit or 7 bit). On the other hand if the maximum NRI length=7, then NRI value=121 can be allocated only once with NRI length 7, since 121 is already 7-bits long. With the above described approaches pools can be expanded without the need to reconfigure the addressing of the whole pool, which supports addressing blade-specific architectures and virtualized core network controllers. Also the TMSI field address space (low vs. high) can be adapted to the needs with the flexible NRI/TMSI length allocation mechanism supported by the proposed addressing scheme.

FIG. 1 shows a situation in which a pool 20 of core network control entities (200a, 200b and 200c) are responsible for controlling mobile entities 10 and 12 when they are connected to the network via the radio network control entities 100a or 100b. In the cellular network each mobile entity is required to report its location to the network from time to time. When a mobile entity is located in a certain area served by a pool of core network control entities, the communication between the mobile entity 10 or 12 and the pool of core network control entities is carried out using the temporary mobile subscriber identity TMSI. The TMSI is used instead of the IMSI (International Mobile subscriber Identity) to protect the subscriber from being identified, because the TMSI only has local significance in the area and is changed when a mobile entity leaves the area controlled by the pool 20 of core network control entities.

In the following a new structure of the temporary identifier will be discussed in more detail wherein the new structure contains an identifier for identifying the core network control entities of variable length. As the length of the identifier for the core network control entities is not fixed, a length indicator is present in the temporary identifier, which indicates how long the actual identifier of the core network control entity is. The new structure of the temporary identifier is discussed in connection with the example shown in FIG. 2 in more detail. The temporary identifier (30) comprises the following specific sections:

Identifier bit length section 32: for example 3 bits to specify the NRI length using a length indicator 34 used to identify the core network control entity. For convenience, but not mandatory, the NRI length indicator 34 will start on bit 23 of the temporary identifier (3) and use bits 21-23, where bit 23 contains the LSB (Least Significant Bit) and, subsequently, bit 21 the MSB (Most Significant Bit) of the new field, Identifier (NRI) bit section 31: variable length section, for example 0-7 bits, according with the length defined by the length indicator 34 in the NRI length bit section 32;

Mobile bit section (TMSI section) 33a and 33b: variable length section, for example 19-24 bits long, depending on the length of Identifier bit length section 32 and comprising the bits used for the mobile identifier part 36a, 36b (TMSI).

Optionally CS/PS Identifier—for example 2 bit-long used to help the radio controller to identify if a TMSI belongs to CS (Circuit Switched) or PS (Packet Switched) domain and 1 bit to prevent that the same TMSI is allocated to two different subscribers after a VLR restart (when VLR data is lost).

As mentioned above this identifier bit section 31 is of variable length as the identifier identifying the node in the pool of core network control entities may occupy all 7 bits or only fewer bits. As will be discussed in connection with FIG. 3 the remaining bits in the section 31 not used for the node identifier can be used for using longer or shorter mobile identifier parts (TMSI field). Accordingly it is possible to use the bit values not occupied by the identifier bit section 31 for the mobile identifier part 36a, b.

Figures 2, 3:
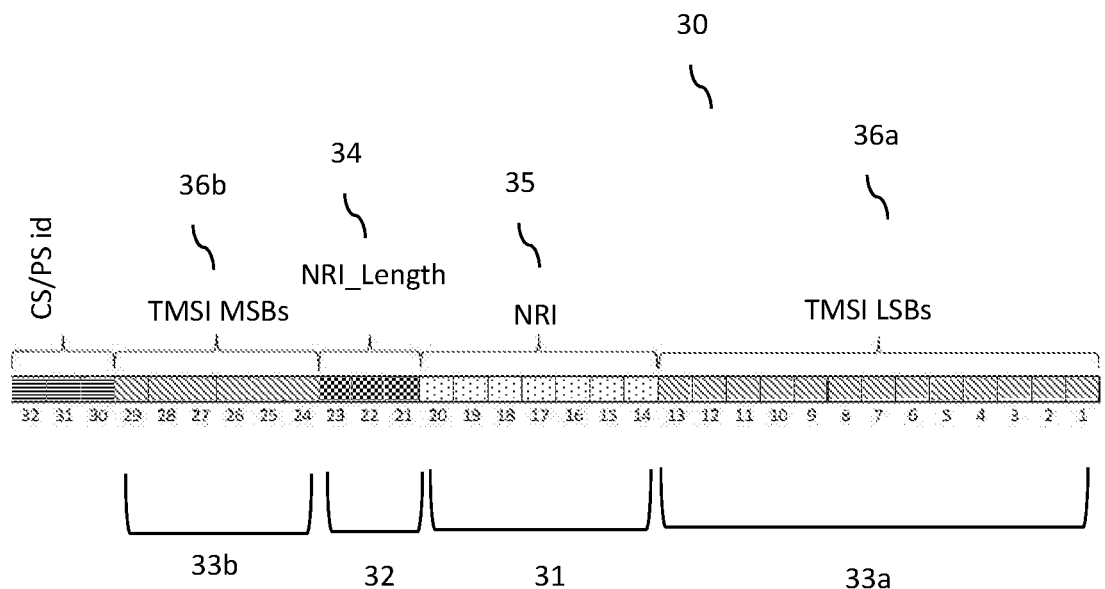
FIG. 2 shows a schematic example structure of a temporary identifier comprising an identifier of a core network control entity of a variable length.
FIG. 3 shows a schematic example of how identifiers of variable length are used and how they are distributed in the temporary identifier.

FIG. 2 shows example lengths and positions of the different fields in the temporary identifier. Different lengths and positions (compared to the ones shown in FIG. 2) can be used instead while still using the principles of the proposed flexible addressing scheme.

FIG. 3 shows 3 example of identifiers (for example NRIs) of different length. In the first example row shown in FIG. 3 it is assumed that the identifier, the NRI, has a value of 15. Its length of 4 bits is indicated in the length section 32 and out of the 7 bits available for the identifier itself 3 bits (14, 15 and 16) are not used for the (NRI) identifier and can therefore be used for the mobile identifier part 36a,b. In the second example row the identifier only occupies 2 bits so that the remaining 5 bits (14 to 18) can be used for the mobile identifier part 36a,b which temporarily and uniquely identifies a mobile entity in the area of the wireless network controlled by the pool of core network control entities. In the last example row of FIG. 3 the identifier occupies all 7 bits so that no bits of the identifier (NRI) are available which might be used for the mobile identifier part 36a,b.

As it will be explained below in connection with FIGS. 4 and 5 core network control entities within the same pool can use identifiers (NRIs) of different lengths. However, the ability to use multiple identifiers for one single physical core network control entity remains unchanged. One important aspect of the current application is related to the fact that with the new structure, the identifiers do not need to have the same length within the network or pool. Identifiers of different length can be mixed in the same core network control entity and the same network or pool. This fact enables the following main advantages:

a pool of core network control entities can be expanded without the need to reengineer (NRI) identifiers used so far and the NRI length used in the pool or even in the whole network;

a change of the pool capacity with an increase or decrease can be performed without problems and without any major traffic disturbance as there is no need for a complete or massive subscriber redistribution;

The new structure is more suitable to cloud-based solutions where a NFV (Network Function Virtualization) performing the function of a core network control entity can be added or removed from the pool at any moment without any need of major network planning or night-time maintenance activities;

The identifiers can be allocated to a node according to the nodes local register capacity.

The same (NRI) identifier value but with a different length value can be assigned to multiple entities due to the fact that the combination of the length value and the (NRI) identifier remains unique.

As discussed in connection with the example shown in FIG. 4 the core network control entities 201 to 203 will assign to each mobile entity a temporary identifier 30 as shown in FIG. 2 having the structure discussed above or a comparable structure. The initial core network control entity (201 to 203) selection for a new mobile entity (10, 11, 12 or 13) registration is done by the radio network control (RNC) entities 100a, 100b using capacity factors known to the radio network control entities 100a and 100b. The RNC specific tables shown in FIG. 4 indicate that the core network control entity 203 (MSC3) has the highest capacity (CF) whereas core network control entity 201 (MSC1) has a lower capacity than entities 202 and 203. Each core network control entity is able to support multiple identifiers and the core network control entity will select one of its preassigned identifiers (NRIs) and based on the identifier and its length will generate a new unallocated TMSI for the new subscriber, map all the relevant information in the available bits and send them as a new temporary identifier 30 to the mobile entity. In the example shown, control entity 201 has selected an identifier with a length of 4 bits for mobile entity 10 whereas the same control entity 201 selects an identifier with a length of 6 bits for mobile entity 11 and the core network control entity 202 selects an identifier with a length of 7 bits for mobile entity 12 and core network control entity 203 selects an identifier having a length of 2 bits for mobile entity 13.

Figure 4:
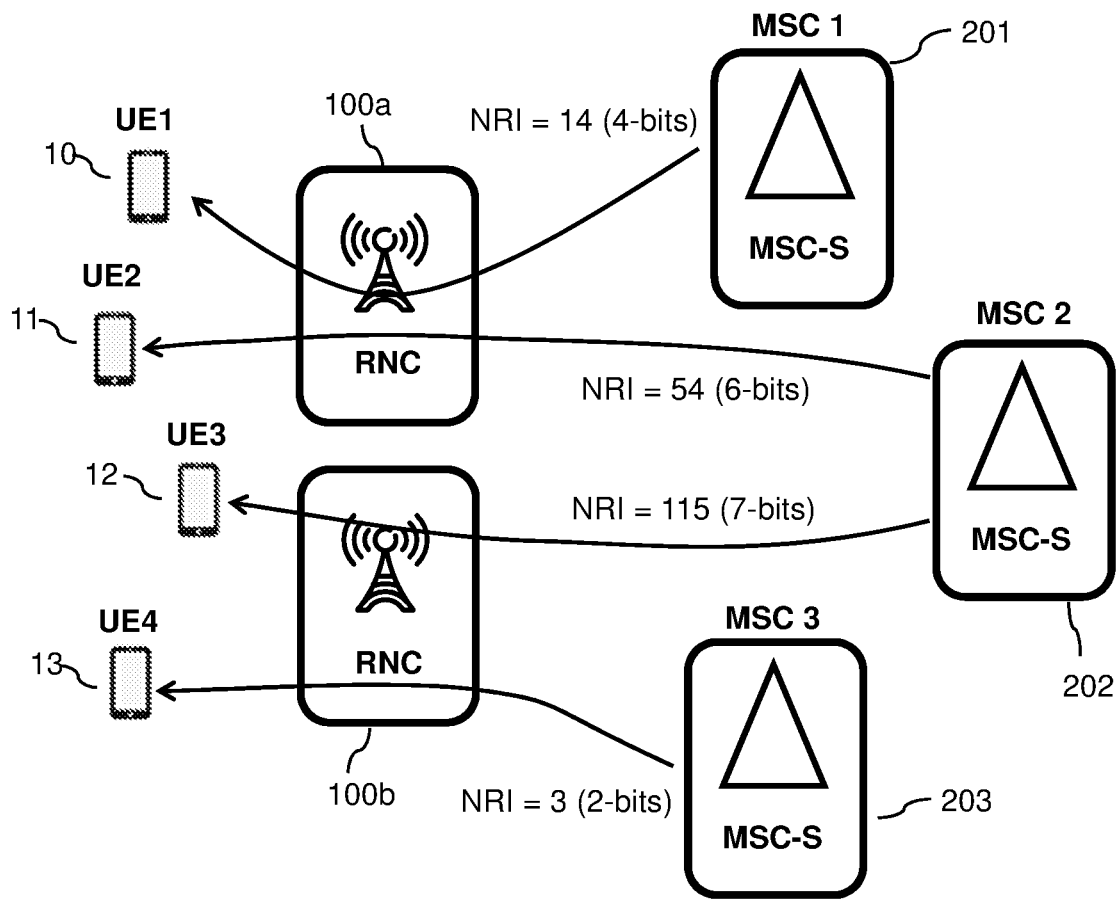
FIG. 4 shows a schematic example architectural view of the system in which temporary identifiers are assigned to different mobile entities by core network control entities within the same pool.

In FIG. 4, radio network control entities 100a and 100b are relaying new registration requests from new subscribers that are trying to register in the pool of core network controllers. The registrations may be distributed by the radio controllers based on a round-robin algorithm that considers the defined capacity factors in their traffic distribution tables. During the registration procedure, in case all the preliminary steps are performed successfully, the core network control entities are initiating the allocation procedure for the temporary identifier 30 mentioned above.

The core network control entity may use an algorithm that is based on the above-described method: the scope of the algorithm is to create a temporary identifier that comprises in addition to the NRI information also information about the length of the used NRI. When the new complete temporary identifier is assembled, the core network controller is sending it to the mobile entity using the established allocation procedure.

In connection with FIG. 5 an example will be discussed in more detail how other network nodes deal with the new format of the temporary identifier (30).

Figure 5:
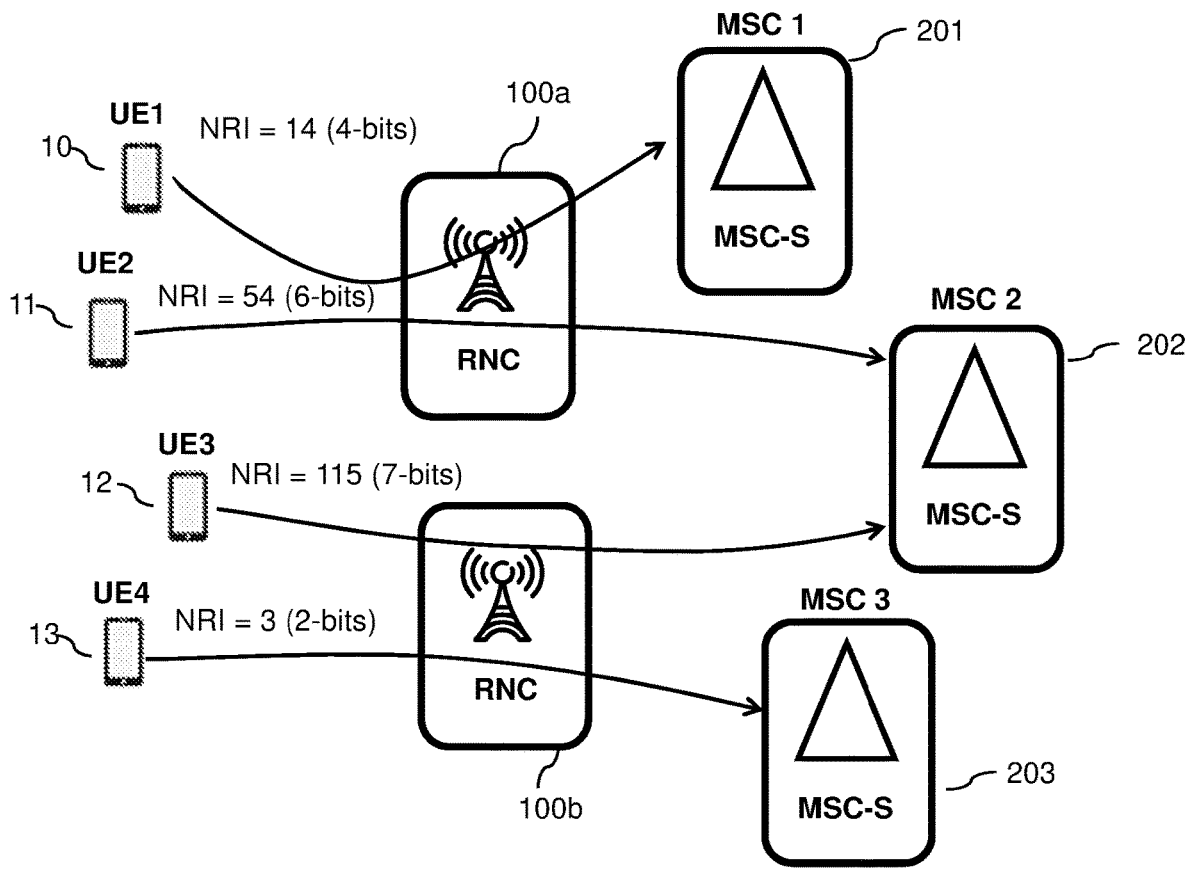
FIG. 5 shows a schematic example architectural view of the system in which traffic is distributed to different core network control entities in a pool, wherein identifiers for identifying the core network control entity can have different lengths.

When a radio network control entity, such as entities 100a or 100b in FIG. 5, or any other network node (a core network control entity that is part of the pool or interworking with the pool—not necessarily of the same type as the pooled network controllers) receives a new message that comprises temporary identifier (30) information, that node should decode the information included in the temporary identifier. In order to do this, the node can perform an algorithm that would allow it to perform the following steps:

Read the length indicator 34, i.e. the NRI length information mentioned in the 3 bits;
Select the right amount of bits (based on the length indicator 34) and find out the correct identifier (e.g. NRI) identifying the core network control node;
Based on the identifier and preferably the length indicator, identify the correct core network control entity that contains the subscriber's registration data
Route the received message(s) according to the information above.

As in the current systems, the traffic distribution table defined in the node receiving the message (for example RNC 100a and 100b in FIG. 5) would create the necessary link between the algorithm-identified identifier (NRI and the information about its length) and the core network control entity that owns that NRI. This method allows that NRIs of different lengths can belong to the same core network control entity, which inter alia allows easy capacity expansions on the core network control entity level.

Applied to the example shown in FIG. 5 this means that the radio network control entity 100a receives a message from the mobile entity 10 wherein the message comprises the identifier with a length of 4 bits. The radio network control entity will determine the length indicator 34 (a length of 4 bits), and using this length indicator it will determine the identifier, NRI (value 14), and will then forward the received message to the core network control entity 201 where the determined identifier of 14 belongs to. The same radio network control entity 100a receives a message from mobile entity 11 comprising an identifier with a length of 6 bits. With the procedure mentioned above the core network control entity 202 will be identified (identifier value=54) and the message will be forwarded to this entity. In the same way radio network control entity 100b will receive a message from mobile entity 12 comprising an identifier with a length of 7 bits and the message from mobile entity 13 comprising an identifier with a length of 2 bits. Using the corresponding length indicator the corresponding identifier, NRI, will be determined and the received messages will be forwarded to the core network control entity 202 and 203, respectively. The radio network control entity may identify the core network control entity to which the message shall be forwarded to either based on a) the value of the identifier (NRI, 35 in FIG. 2) determined from the message, or b) the combination of the length indicator (34 in FIG. 2) and the value of the identifier (NRI, 35 in FIG. 2) determined from the message. The later approach (b) offers the advantage that more core network control entities can be addressed with the combination of the length indicator (34 in FIG. 2) and the identifier value (35 in FIG. 2) compared to when using the identifier value (35 in FIG. 2) alone. Option a) limits the total amount of entities that can be deployed in the pool so that the following examples mainly refer to option (b).

As already mentioned above, with the proposed method, there is no need to change the structure of the traffic distribution tables: the method proposes that the length indicator is always occupying the same bits in the temporary identifier 30, and that the NRI calculation algorithm knows which are the bits that need to be read in order to determine the length of the identifier, NRI.

Figure 6:
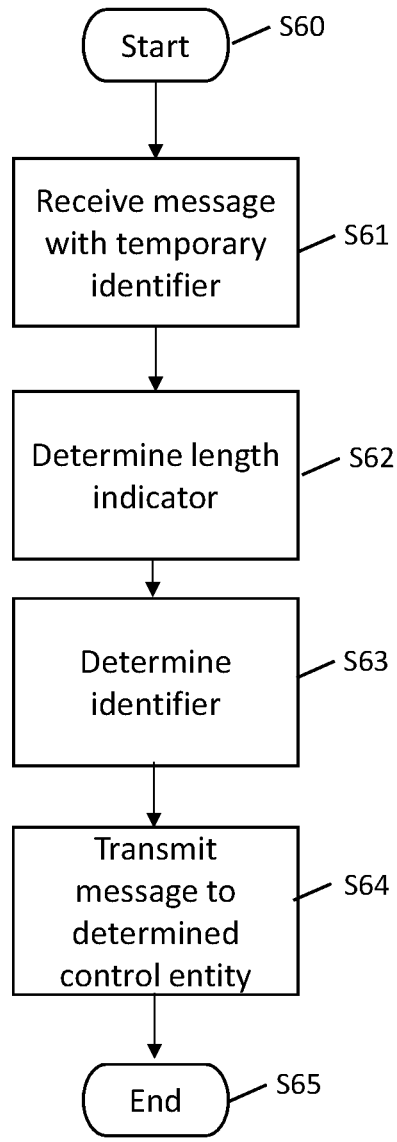
FIG. 6 shows an example flowchart of a method carried out by a network entity receiving a message which comprises a temporary identifier comprising an identifier of the core network control entity of variable length.

FIG. 6 summarises in an example the steps carried out by a node receiving a message comprising a temporary identifier 30 with the structure discussed above, such as nodes 100a,b of FIG. 5. The method starts in step S 60 and in step S 61 the message with the temporary identifier is received by the node, e.g. a radio network control entity 100a or 100b as shown in FIG. 4 or 5. In step S 62 the length indicator is determined and with this information the receiving node can determine the identifier 35 which uniquely identifies the core network control entity. When the core network control entity is identified, it is possible in step S 64 to transmit the received message to the determined core network control entity. The method ends in step S 65.

Figure 7:
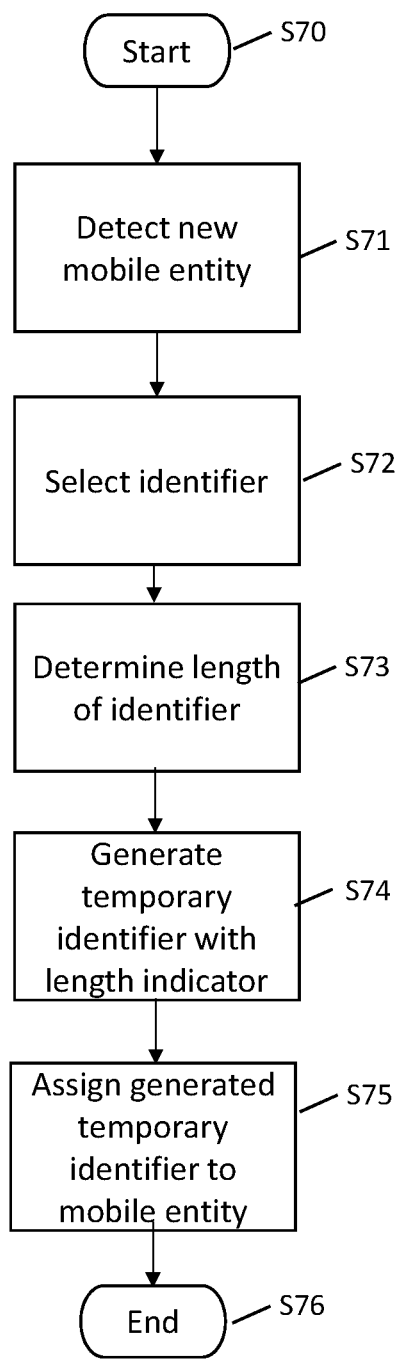
FIG. 7 shows an example flowchart of a method carried out by the core network control entity when a temporary identifier is assigned to a new mobile entity in which the lengths of the identifier is not fixed.

FIG. 7 summarises in an example the steps carried out by the core network control entity which assigns the temporary identifier 30 with the new format. In step S 70 the method starts and in step S 71 a new mobile entity is detected by one of the core network control entities of the pool. In step S 72 the NRI, an identifier of the core network control entity, is selected and in step S 73 the length of the selected identifier is determined. Based on this information the node can determine how many bits are available for the mobile identifier part 36 a,b which is used to uniquely identify the mobile entity. Based on this information the temporary identifier comprising the length indicator 34, the identifier 35 and the mobile identifier part 36a,b is generated in step S 74. Last but not least, in step S 75 the generated temporary identifier 30 is assigned to the mobile entity. The method ends in step S 76. The determined mobile identifier in the mobile identifier part 36 a, b can be either unique for a mobile entity served by the core network control entity, or it can be unique for the identifier 35 of the core network control entity (thus allowing the reuse of the same mobile identifier in the mobile identifier part 36 *a, b* for different core network control entity identifier values 35, which leads to a higher number of mobile entities that can be supported by the core network control entity).

Figure 8:
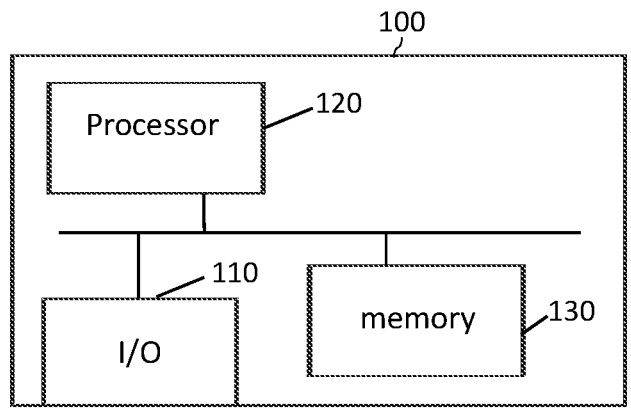
FIG. 8 shows an example schematic representation of a network entity receiving the message comprising a temporary identifier with an identifier of variable length.

FIG. 8 shows a schematic example architectural view of an entity 100 which can carry out the above discussed steps of FIG. 6. The entity 100 can be a radio network control entity or, as mentioned above a core network control entity associated with the pool of core network control entities. The entity 100 comprises an interface 110 which is provided for transmitting user data or control messages to other entities and to receive user data or control messages from other entities. The interface is especially qualified to receive messages comprising the above discussed temporary identifier 30 and to transmit or forward the received message when the destination node is determined as mentioned in FIG. 6. The entity 100 furthermore comprises a processor 120 which is responsible for the operation of the entity 100. The processor 120 comprises one or more processing units and can carry out instructions stored on a memory 130, wherein the memory may comprise a read-only memory, a random access memory, a mass storage, a hard disk or the like. The memory can furthermore comprise suitable program code to be executed by the processing unit 120 so as to implement the above described functionalities in which the entity 100 is involved (for example with respect to the steps of FIG. 6). Since the entity 100 may be implemented as a virtual network function, it is possible that not all steps of FIG. 6 are carried out by the same physical entity.

Figure 9:
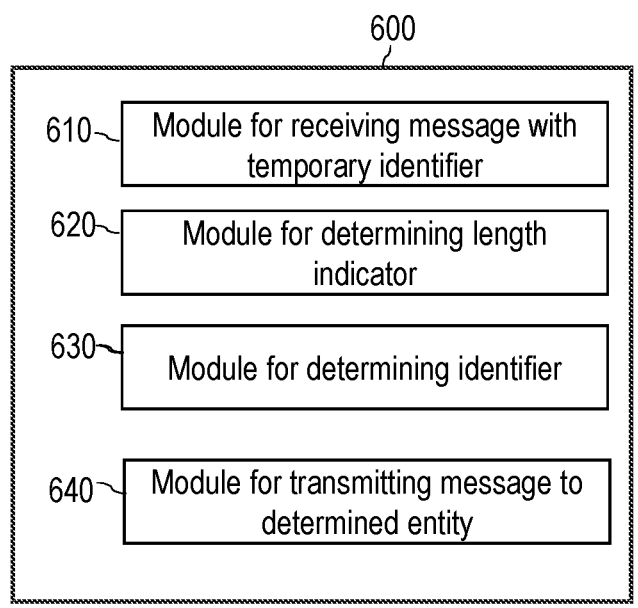
FIG. 9 shows another example schematic representation of a network entity as shown in FIG. 8.

FIG. 9 shows a further example of an entity 600 similar to the entity 100 of FIG. 8 and which is configured to handle messages with a temporary identifier comprising an identifier of a core network control entity of variable length. This entity 600 comprises a module 610 for receiving the message with the temporary identifier. Furthermore, a module 620 is provided for determining the length indicator contained in the temporary identifier. A module 630 is provided for determining the identifier using the length indicator. Module 640 can initiate a transmission (or forwarding) of the received message to the identified core network control entity.

Figure 10:
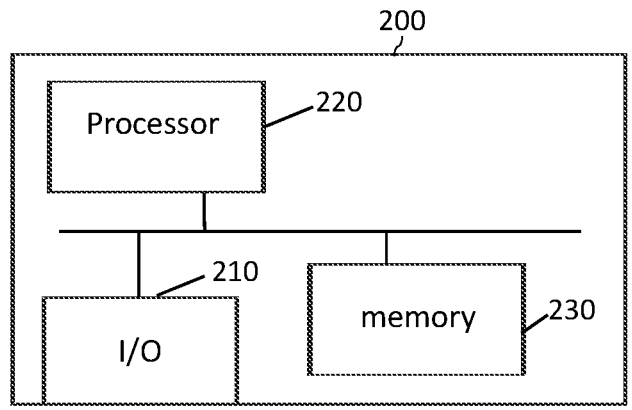
FIG. 10 shows an example schematic representation of a core network control entity which generates a temporary identifier comprising an identifier of the core network control entity having a variable length.

FIG. 10 shows a schematic example view of a core network control entity 200 which is configured to carry out the steps mentioned in FIG. 7. The entity 200 comprises an interface 210 via which the entity 200 can communicate with other entities such as the mobile entities 10 to 13 or the radio network control entities 100*a*, 100*b* shown in FIGS. 4 and 5. A processor 220 is provided which is responsible for the operation of the core network control entity 200. The processor 220 can comprise one or more processing units and can carry out instructions stored on a memory 230. The memory can comprise a read-only memory, a random access memory, a mass storage, a hard disk or the like and can comprise suitable program code to be executed by the processor 220 so as to implement the above described functionalities in which the core network control entity 200 is involved (for example with respects to the steps of FIG. 7). Since the entity 200 may be implemented as a virtual network function, it is possible that not all steps of FIG. 6 are carried out by the same physical entity.

Figure 11:
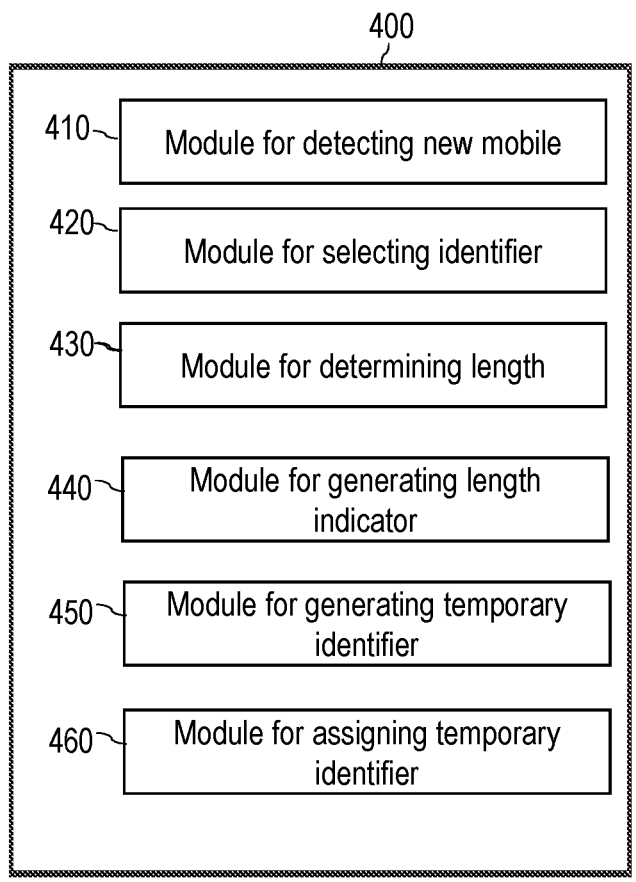
FIG. 11 shows another example schematic representation of a core network control entity shown in FIG. 10.

FIG. 11 shows a further example of a core network control entity 400 configured to determine the new temporary identifier. The entity 400 comprises a module 410 for detecting a new mobile entity which is not yet handled by the core network control entities. A module 420 is provided for selecting one of the identifiers having a certain length with which the core network control entity can be identified. A module 430 is provided for determining the length of the selected identifier. A module 440 is provided for generating the length indicator 34 and based on this information a module 450 can generate the temporary identifier comprising the length indicator 34 and comprising the identifier 35 itself and a mobile identifier part 36 *a, b*. A module 460 is provided for assigning the generated temporary identifier to the newly detected mobile entity.

From the above discussion some general conclusions can be drawn:

As far as the network entity 100 receiving the message with the temporary identifier is concerned the length indicator is preferably coded in a predefined set of bits in the temporary identifier 30, wherein the length indicator 34 is determined by reading the length indicator from the predefined set of bits. In the example mentioned above the bits 21 to 23 were used, however it should be understood that any other bit numbers may be used.

The length indicator 34 can be coded in three consecutive bits located at predefined positions of the temporary identifier, e.g. bits 21 to 23.

A number of bits occupied by the identifier in the temporary identifier is determined based on the length indicator 34.

As discussed above in connection with FIG. 2, the temporary identifier 30 comprises an identifier bit section 31 comprising the maximum number of bits occupied by the identifier 35. The temporary identifier 30 furthermore comprises a mobile bit section 33*a* and 33*b* which comprises a mobile identifier part 36*a,b* which is used to uniquely identify the mobile entity. When it is determined that the identifier 35 is shorter than the identifier section 31, remaining bits of the identifier bit section 31 not covered by the identifier 35 are considered as belonging to the mobile identifier part 36*a,b*.

Accordingly the mobile identifier part 36*a,b* can be determined using the bit values in the mobile bit section 33 *a*, 33 *b* and the remaining bits of the identifier bit section 31. This was discussed above in connection with FIG. 3.

The core network control entity is identified based on the identifier and the length indicator.

As far as the core network control entity 200 is concerned, the temporary identifier 30 has a predefined overall length wherein the generated temporary identifier is generated such that the length indicator is coded in a predefined set of bits in the temporary identifier 30.

The generated temporary identifier 30 may be generated such that the length indicator 34 is coded in three consecutive bits located at predefined positions of the temporary identifier.

The temporary identifier 30 can be generated such that the temporary identifier comprises an identifier bit length section 32 which defines a number of bits occupied by the identifier 35 and a mobile section 33 *a,b* comprising a mobile identifier part 36 *a,b* which is used to uniquely identify the mobile entity. A bit length occupied by the identifier in the identifier bit section 31 is determined and the mobile identifier part 36 *a,b* is generated taking into account the determined bit length occupied by the identifier 35.

The mobile identifier part 36 is generated such that remaining bits in the identifier bit section 31 not occupied by the identifier 35 are used for generating the mobile identifier part 36 *a,b*.

The temporary identifier can be the TMSI.

Furthermore, the temporary identifier 30 may be generated such that identifier bit section 31 comprises 7 bits.

With the new mechanism, it is possible to expand pools of core network control entities without any limitations imposed by a fixed NRI length.

Also, based on the current standards, using of 2-bit NRIs does not make any sense—most likely, a pool with 3 nodes would need very soon after it is deployed additional nodes. The proposed mechanism eliminates this limitation: 2-bit long NRIs could now be used for very large capacity nodes, while 3, 4 or more bits-long NRIs could be easily allocated to other members of the same pool.

Expansion of a pool could be done at any moment, new nodes and new NRIs could be added to the network without any need to recon Figure the already deployed pool or, optionally, perform just a limited subscriber reallocation from the existing pool members to the new nodes added to the pool.

The proposed solution does not require any changes in the standards: for the mobile entity. For the mobile entity the new structure is completely transparent, and the UE will continue to store and use a 32-bit long TMSI (in the way it does also in this moment).

A new method is proposed that allows flexible allocation of the core network identifiers and easy expansion (risk free) for pools or a mobile network of core network control entities.

The new structure of the temporary identifier allows more flexibility related to the expansion of a pool's number of core network control entities from both capacity and amount of members perspective. The expansion can be done without any traffic disturbances and without the need to reengineer the NRI length used for the core network controllers.

The method is also in line with the changes that are expected by the introduction of core network virtualization where it is expected that:

a large amount of virtual machines with relatively small capacity that will need to coexist for a certain period of time with large capacity classical core network controllers and based on the network traffic needs, virtual machines can be added or removed in almost real-time to a network consisting of one or more pools of core network controllers.

The invention claimed is:

1. A method for operating a network entity provided in a wireless communications network, the method comprising:
    receiving a message comprising a temporary identifier of a mobile entity, wherein the temporary identifier is used to temporarily identify the mobile entity, and wherein the temporary identifier comprises an identifier of variable length, which is used to identify a core network control entity that controls the mobile entity when connected to the wireless communications network,
    determining a length indicator present in the temporary identifier, the length indicator indicating a length of the identifier in the temporary identifier,
    determining the identifier in the temporary identifier based on the length indicator and the core network control entity based on the identifier, and
    transmitting the received message to the determined core network control entity.

2. The method according to claim 1, wherein the length indicator is coded in a predefined set of bits in the temporary identifier, and wherein the length indicator is determined by reading the length indicator from the predefined set of bits.

3. The method according to claim 1, wherein a number of bits occupied by the identifier in the temporary identifier is determined based on the length indicator.

4. The method according to claim 1, wherein the temporary identifier comprises an identifier bit section comprising a maximum number of bits occupied by the identifier, and a mobile bit section comprising a mobile identifier part used to uniquely identify the mobile entity, and wherein when it is determined that the identifier is shorter than the identifier bit section, remaining bits of the identifier bit section not covered by the identifier are considered as belonging to the mobile identifier part.

5. The method according to claim 1, wherein the core network control entity is identified based on the identifier and the length indicator.

6. A method for operating a core network control entity in a pool of core network control entities, wherein the pool is configured to control mobile entities, wherein the core network control entity comprises a plurality of different identifiers of a variable length, and wherein each identifier is used to identify the core network control entity, the method comprising:
    detecting a new mobile entity, which is not yet controlled by one of the core network control entities of the pool,
    selecting an identifier, from the plurality of different identifiers for the new mobile entity, which is used to identify the core network control entity,
    determining a length of the selected identifier,
    generating a length indicator, which indicates the length of the selected identifier,
    generating a temporary identifier for the new mobile entity, which is used to temporarily identify the new mobile entity, wherein the temporary identifier is generated such that the length indicator and the identifier are part of the temporary identifier, and
    assigning the generated temporary identifier to the new mobile entity.

7. The method according to claim 6, wherein the temporary identifier has a predefined overall length, and wherein the temporary identifier is generated such that the length indicator is coded in a predefined set of bits in the temporary identifier.

8. The method according to claim 6, wherein the temporary identifier is generated such that the temporary identifier comprises an identifier bit length section defining a number of bits occupied by the identifier, and a mobile bit section comprising a mobile identifier part used to uniquely identify the mobile entity, and wherein a bit length occupied by the identifier in an identifier bit section is determined, and the mobile identifier part is generated, taking into account the determined bit length occupied by the identifier.

9. The method according to claim 8, wherein the mobile identifier part is generated such that remaining bits of the identifier bit section not occupied by the identifier are used for generating the mobile identifier part.

10. A network entity of a wireless communications network, the network entity comprising a memory and at least one processor, the memory containing instructions executable by said at least one processor, wherein the network entity is operative to:
    receive a message comprising a temporary identifier of a mobile entity, wherein the temporary identifier is used to temporarily identify the mobile entity, and wherein the temporary identifier comprises an identifier of variable length, which is used to identify a core network control entity that controls the mobile entity when connected to the wireless communications network,
    determine a length indicator present in the temporary identifier, the length indicator indicating a length of the identifier in the temporary identifier, determine the identifier in the temporary identifier based on the length indicator and the core network control entity based on the identifier, and transmit the received message to the determined core network control entity.

11. The network entity according to claim 10, wherein the network entity is operative to code the length indicator in a predefined set of bits in the temporary identifier, and to determine the length indicator by reading the length indicator from the predefined set of bits.

12. The network entity according to claim 10, wherein the network entity is operative to determine a number of bits occupied by the identifier in the temporary identifier based on the length indicator.

13. The network entity according to claim 10, wherein the temporary identifier comprises an identifier bit section comprising a maximum number of bits occupied by the identifier, and a mobile bit section comprising a mobile identifier part used to uniquely identify the mobile entity, and wherein the network entity is operative to determine that the identifier is shorter than the identifier bit section, and to consider remaining bits of the identifier bit section not covered by the identifier as belonging to the mobile identifier part.

14. The network entity according to claim 10, wherein the network entity is operative to identify the core network control entity based on the identifier and the length indicator.

15. A core network control entity provided in a pool of core network control entities, wherein the pool is configured to control mobile entities, wherein the core network control entity comprises a plurality of different identifiers of a variable length, and wherein each identifier is used to identify the core network control entity, the core network control entity comprising a memory and at least one processor, the memory containing instructions executable by said at least one processor, wherein the core network control entity is operative to:

detect a new mobile entity, which is not yet controlled by one of the core network control entities of the pool, select an identifier, from the plurality of different identifiers for the new mobile entity, which is used to identify the core network control entity, determine a length of the selected identifier, generate a length indicator, which indicates the length of the identifier, and generate a temporary identifier for the mobile entity, which is used to temporarily identify the new mobile entity, wherein the temporary identifier is generated such that the length indicator and the identifier are part of the temporary identifier, and assign the generated temporary identifier to the new mobile entity.

16. The core network control entity according to claim 15, wherein the core network control entity is operative to generate the temporary identifier such that the length indicator is coded in a predefined set of bits in the temporary identifier having a predefined overall length.

17. The core network control entity according to claim 15, wherein the core network control entity is operative to generate the temporary identifier such that the temporary identifier comprises an identifier bit length section defining the number of bits occupied by the identifier, and a mobile bit section comprising a mobile identifier, part used to uniquely identify the mobile entity, configured to determine a bit length occupied by the identifier in an identifier bit section, and to generate the mobile identifier part taking into account the determined bit length occupied by the identifier.

18. The core network control entity according to claim 17, wherein the core network control entity is operative to generate the mobile identifier part such that remaining bits of the identifier bit section not occupied by the identifier are used for generating the mobile identifier part.

19. A computer program product comprising a non-transitory computer readable medium storing program code to be executed by at least one processor of a network entity to cause the at least one processor to perform a method according to claim 1.

20. A computer program product comprising a non-transitory computer readable medium storing program code to be executed by at least one processor of a core network control entity to cause the at least one processor to perform a method according to claim 6.

* * * * *